Nov. 22, 1949 D. A. SCHROCK 2,489,201
ACETYLENE TORCH CUTTING MACHINE
Filed Feb. 27, 1947 3 Sheets-Sheet 1
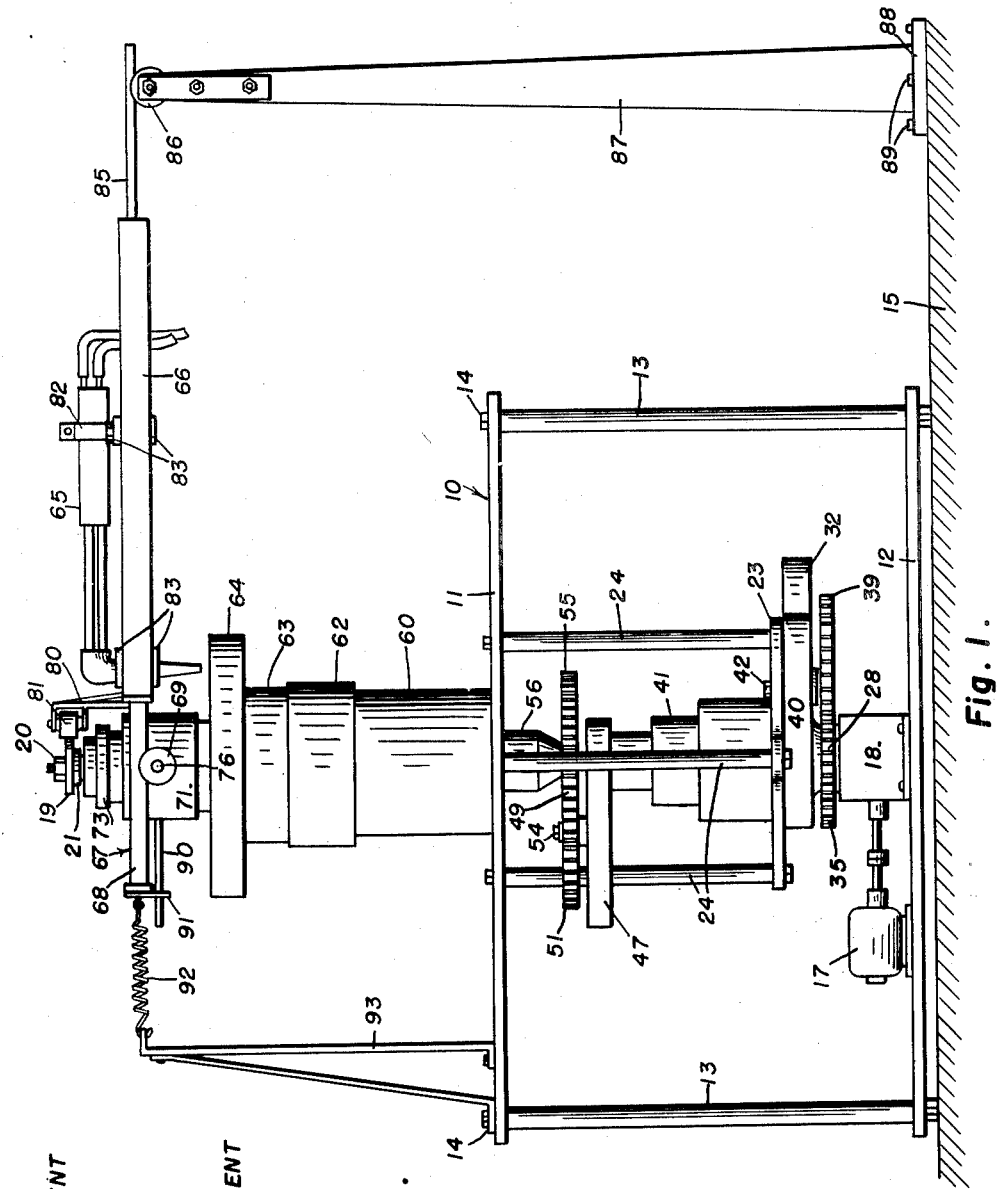
Inventor
Daniel A. Schrock

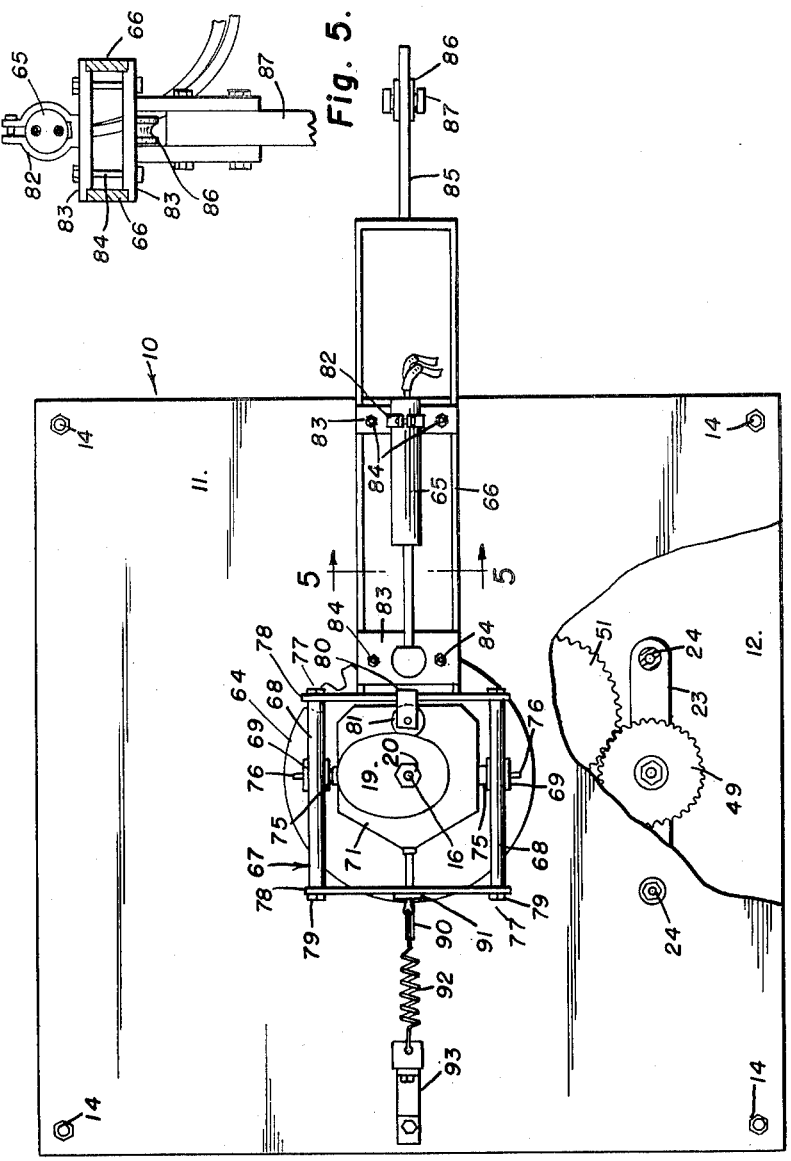

Nov. 22, 1949  D. A. SCHROCK  2,489,201
ACETYLENE TORCH CUTTING MACHINE
Filed Feb. 27, 1947  3 Sheets-Sheet 3

Inventor
Daniel A. Schrock
By Clarence A. O'Brien
and Harvey B. Jacobson
Attorneys Patented Nov. 22, 1949

2,489,201

UNITED STATES PATENT OFFICE 2,489,201

ACETYLENE TORCH CUTTING MACHINE

Daniel A. Schrock, Boise, Idaho, assignor to Idaho Sprocket and Machine Works, Boise, Idaho, a copartnership Application February 27, 1947, Serial No. 731,249

9 Claims. (Cl. 266—23)

My invention relates to an acetylene cutting machine for the purpose of cutting different sized sprockets and the like from a circular blank of material or metal, by means of an oxy-acetylene torch for automatically cutting teeth entirely around the blank.

An object of the invention is to provide an acetylene cutting machine for cutting sprocket wheels and the like from blanks, in which the movement of the acetylene torch is controlled by the rotation of a cam, so that a tooth is cut for each rotation of the cam while the sprocket blank from which the sprocket wheel is cut is moved an appropriate portion of a revolution for each complete revolution of the cam.

Another object of the invention is to provide an automatic acetylene cutting machine of simple construction and assembly, which may be varied to cut sprocket wheels or gears having any desired number of teeth.

Other objects and advantages reside in the details of construction and operation as more fully hereinafter described and claimed, reference being had to the accompanying drawings forming part hereof, wherein like numerals refer to like parts throughout, and in which:

Figure 1 is a side elevation of an acetylene cutting machine constructed in accordance with the invention;

Figure 2 is a top plan view thereof as shown in Figure 1;

Figure 5 is a sectional view taken on the line 5—5 of Figure 2; and,

Figure 6 is a detailed diagrammatic view of a sprocket wheel or gear showing the relative movement between the sprocket blank and the torch of the oxy-acetylene burner and flame thereof.

Figure 4:
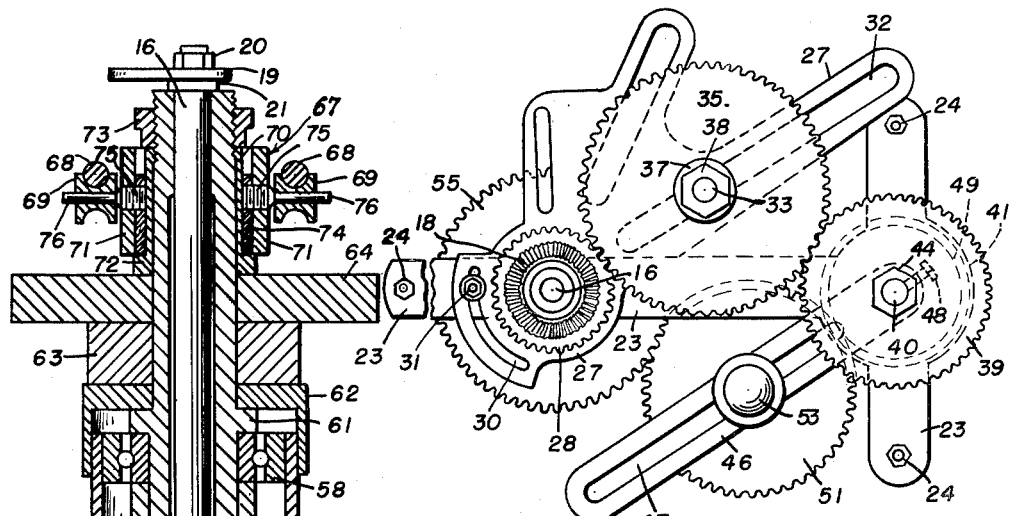
Figure 4 is a bottom plan view of the drive gearing above the lower frame plate looking upwardly in the plane of the line 4—4 of Figure 3.
Figure 3:
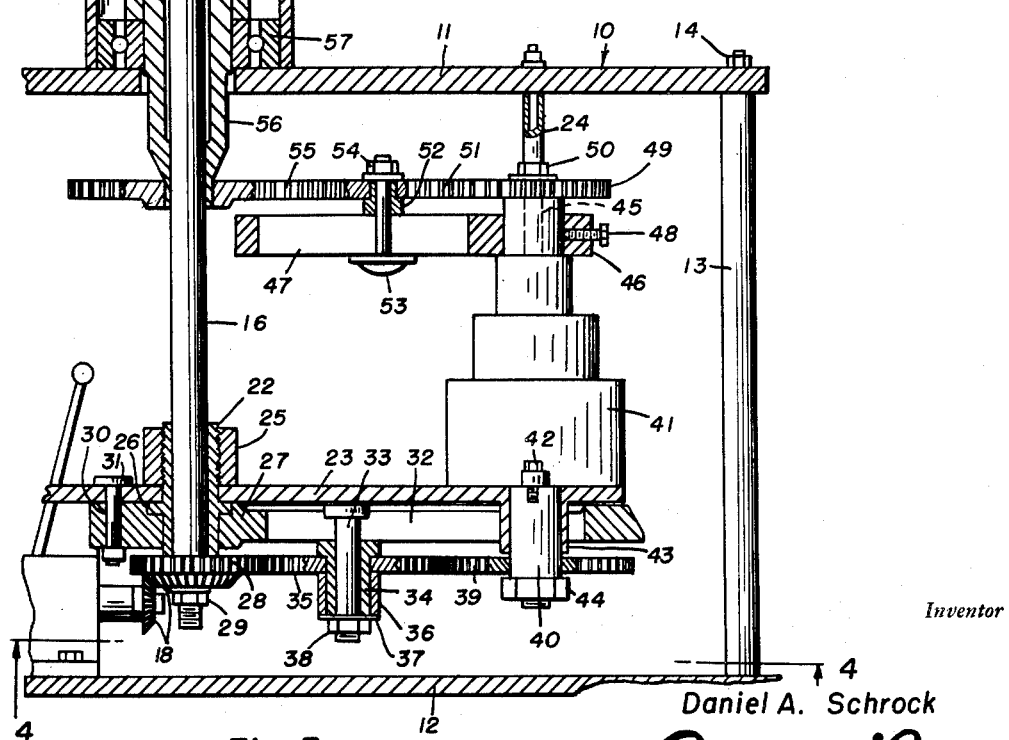
Figure 3 is an enlarged fragmentary transverse vertical sectional view through the machine, showing a gear drive arrangement.

Referring to the drawings in detail, in which like reference characters designate corresponding parts throughout the several views, the acetylene cutting machine of my invention is shown as comprising a frame 10 having a rectangular top plate 11 and a spaced parallel bottom plate 12 of similar configuration connected and braced at the corners by connecting and spacing members consisting of legs or bars 13 having reduced end portions passing through corresponding holes at the corners of the frame plates suitably threaded and engaged by clamping nuts 14 so as to hold the top and bottom frame plates in rigid spaced parallel relation for mounting the same upon a suitable horizontal support or work surface, such as a floor 15. A cam drive shaft 16 is journaled vertically in the frame and may be driven from a suitably controlled variable speed gear reduction electric motor 17 through the medium of a reduction gear 18 between the rotor shaft of the motor and the lower end of the cam drive shaft 16 as shown in Figures 1 and 3 of the drawings. An eccentric or cam 19 is fixed on the upper end of the shaft 16 by suitable means such as a nut 20 mounted on a reduced threaded upper end of the shaft forming a shoulder with a spacer or washer 21 on which the cam rests while retained in position by the nut 20. The shaft 16 is journaled in a bearing 22 at its lower end extending through a frame member or plate 23 of substantially T-shape formation, hung or suspended from the top plate 11 of the frame 10 as by means of hangers, bolts or rods 24, or otherwise suitably supported substantially centrally of the frame between the top and bottom plates 11 and 12. The bearing 22 is retained in position in the frame or plate 23 as by means of a nut 25 engaged on the threaded upper end thereof, and is further provided with an annular shoulder or flange 26 below the frame 23 in the form of a plate or spider, to clamp the latter between the flange or shoulder 26 and the nut 25 and to extend through the inner end of a gear rack or bracket 27 to receive the shaft 16 therethrough with a reduced lower end below the bearing 22 on which a gear 28 having 32 teeth is fixed above the larger gear of the reducing gear 18 connecting the shaft to the motor or other drive means and held by a nut 29 on said reduced lower end of the shaft 16. The gear rack or bracket 27 is capable of turning about the shaft 16, and for this purpose is provided with an arcuate slot 30 concentric to the shaft 16 to receive a clamping bolt 31 after extending through the plate or frame member 23 to hold the gear rack or bracket 27 in place. The gear rack or bracket 27 also is provided with an arm having a longitudinal slot 32 receiving a bolt 33, the head of which is recessed or countersunk in the top of the bracket 27 and slot 32 and supports a spacer and bearing sleeve 34 flanged at the top to form a spacer between the bottom surface of the bracket and a sixty-four tooth idler gear 35 mounted on the bearing to turn and mesh with the gear 28 beneath the spacer flange and between it and a spacer sleeve 36 on which gear 35 is supported in connection with a washer 37 and a nut 38 on the threaded lower end of the bolt 33. The gear 35 meshes with a fifty-six tooth gear 39 fixed on a depending shaft 40 extending down from a planetary gearing of a five-to-one ratio contained in a gear box 41 mounted on plate or frame 23 and secured in position by bolting or otherwise as indicated at 42 so as to extend through a bearing 43 of frame member or plate 23 for rotation of the shaft 40 therein, with a nut 44 engaged on the lower threaded end of the shaft 40 at its threaded reduced portion to secure the gear 39 in position.

A shaft 45 projects from the upper end of the planetary gearing of the gear box 41 and at this point is formed with a reduced portion providing a shoulder to mount a gear rack or bracket 46 having a longitudinal slot 47 and fixed to the gear box as by a set screw 48 with the shaft 45 extending therethrough to mount a forty tooth gear 49 for rotation on the planetary or reduction gear box 41 and with the shaft 45 retained by a nut and washer 50. The gear 49 meshes with a fifty-six tooth idler gear 51 mounted on a spacer and bearing sleeve 52 supported on bracket 46 and receiving a bolt 53 extending through slot 47 to secure the same to the bracket 46 and held by a nut 54 and interposed washer mounted on the upper threaded end of the bolt 53. The gear 51 meshes with a sixty-four tooth gear 55 fixed or pressed on the reduced lower end of a tubular main spindle 56 rotatably receiving the shaft 16 and rotatably extending through the top plate 11 of the frame 10. The hollow main spindle 56 is rotatably supported in ball bearings 57 and 58 between which a spacer sleeve 59 is positioned on the spindle within the bearing housing 60. The end thrust is taken up by a flange 61 of the spindle resting on the upper bearing 58, with a flanged steel disc or cap 62 resting on the flanged shoulder 61 and engaged over the housing 60 to support a spacer collar 63. The latter may be of a desired thickness which may be varied to support a circular sprocket or gear blank 64 within three-eighths of an inch of a cutting torch 65 of the oxyacetylene type movably mounted on an elongated frame 66 adapted to slide back and forth relative to the blank 64, closer or farther away from the axis thereof according to the size of the sprocket or gear to be cut, radially thereof at the profile and root of each tooth or recesses between the teeth to be cut. This support or extension frame 66 forms part of a roller frame 67 having side bars 68 preferably of circular cross section longitudinally movable on grooved rollers 69 to movably support the torch frame 67 for reciprocation thereon.

The cam 19 is supported above the upper end of the spindle 56 on the upper end portion of which a spacer sleeve 70 is mounted to permit the spindle to turn without binding at the spaced parallel sides of a roller frame 71. The lower end of the sleeve 70 has a flange or shoulder 72 engaging the top surface of the blank 64 and the upper end portion of the spindle is externally threaded to take a nut 73 which clamps the roller assembly and sprocket blank upon the steel disc or cap 62 in connection with the spacer 63 and bearings 57 and 58 supported on the top plate 11 of the frame 10, by pressure against the upper end of the sleeve 70. A suitable bronze or other bushing 74 pressed in the roller frame 71 rests upon the shoulder 72 around the spacer sleeve 70 and is provided in conjunction with the frame 71, with axially aligned horizontal threaded apertures to take the threaded enlarged ends 75 of axle pins or studs 76 forming spindles rotatably supporting the rollers 69 on which the torch frame 66 is movable back and forth at the sides 68. The torch frame is adapted to move back and forth on the rollers of the roller frame and for this purpose, the side bars 68 are connected in spaced parallel relation through the medium of the reduced threaded ends 77 thereof extending through holes in the end portions of connecting bars 78 and held by nuts 79 or otherwise. The front support or extension 66 forming the torch frame is connected in horizontal alignment with one of the bars 78 which bears a bracket 80 journaling a horizontal roller 81 on a vertical axis in alignment with and for engagement at its periphery by the cam 19, to move the torch frame and torch back and forth in its reciprocation radially of the blank at the notches between the teeth in both the profile and root of each tooth to be cut while the blank is turned or revolved with the spindle 56 through the medium of the drive gearing heretofore described, the cam turning or making one complete revolution while the sprocket blank is moved the distance of one tooth, such as one-fourteenth of a revolution for a fourteen tooth sprocket or gear, or otherwise, depending upon the number of teeth around the periphery of the sprocket or gear, with the gear ratio between the various gears of the mechanism varied accordingly by merely changing the gear sets at the respective gears 28, 35, 39, 49, 51 and 55 in connection with the reduction or planetary gearing 41 of a five-to-one ratio or otherwise. Ordinarily however, the planetary gearing remains the same with the change in the other gears. The particular gear set-up described is for cutting a fourteen tooth sprocket or gear, and may be varied for cutting sprockets or the like from four to ninety-six teeth. The torch 65 is shown provided with flexible hose connecting the same to the cylinders for oxygen and acetylene gas controlled by valves in the usual manner, and is clamped to the support at the back, as indicated at 82 on cross bars 83 bolted in position as indicated at 84 as more particularly shown in Figures 1, 2 and 5 of the drawings. The end of the torch frame 66 is provided with an outwardly extending end rod 85 which is supported by and moved on a roller 86 supported on a separate stand 87 on the floor 15 and shown having its base 88 bolted thereto as indicated at 89 or otherwise suitably anchored in position. At the opposite end remote from the outer end of the torch frame which bears on the roller 86, the roller frame 71 is provided with a central extension rod 90 which slides in the end of the torch frame as indicated at 91 to hold the rollers straight in line with the carriage or rods 68, the cam moving the torch in one direction and the return movement being effected by a pull spring 92 connected to the torch frame and suitably anchored to the frame 10 as by means of a bracket 93 on the top plate 11, although other suitable means may be provided for imparting return movement to the torch frame in connection with the cam as described. The torch 65 is also held to the frame 66 by a similar support consisting of the bars 83 and connecting bolts 84 as shown in Figure 5, so that the torch is supported on the frame 66 for sliding movement or adjustment so as to move closer or farther away from the periphery of the circular blank from which the sprocket wheel or gear is cut, according to the size thereof, and to be shifted back and forth in its reciprocation by the action of the cam 19 in engagement with the roller 81 as previously described. This adjustment may be quickly and easily effected on the sides of the rectangular or U-shaped frame 66, as will be readily apparent from Figure 2 of the drawings. Also, the rods or bolts 14 and 24 instead of having reduced ends, may have pipes or tubes mounted thereon between the plates 11 and 12 and 11 and 23 in order to effect the required spacing, even though the member 23 is in the form of a spider or T-shaped part as described. Also, it is obvious that the lower frame plate 12 may be omitted so that the bolts or members 13 form legs fastened to the top plate 11 of the frame 10 to support the device at an elevation from the floor, preferably approximately 21 inches long. In this instance, the motor 17 may be otherwise suitably supported, as upon the floor, or otherwise on the frame.

Thus, in the operation of the acetylene cutting machine as described, to cut different size sprockets or gears, both the shaft 16 and the spindle 56 are rotated, the former to drive the cam 19 and the latter from the gear 28 which is fixed to the adjacent gear 18 and revolves on the lower end of the shaft 16, so as to drive the spindle 56 through the intermediate gear drive connections or gear trains including the planetary or reduction gear 41 to rotate the sprocket or like blanks 64, so that a proper ratio is established between the speed of rotation of the cam and the blank whereby the cam will make one complete revolution while the sprocket blank would move the distance of one tooth, or one fourteenth of a revolution in the case of a fourteen tooth gear and thus intermittently move the distance of one tooth and the distances between the teeth in both the profile and root of each tooth to be cut. The torch frame together with the torch thereon are moved back and forth on the rollers 69 of the roller frame mounted on the blank and spindle bearing as described supported by the upper plate 11 on the frame. This plate forms the top plate of a frame supported on the legs when the lower plate 12 is omitted, thus providing a bed plate for supporting tools and other parts in convenient position for use. The torch frame is also guided by the roller 86 supported upon the stand 87, so that in conjunction with the roller frame, the parts are properly guided back and forth in a straight line. This is assisted by the action of the carriage formed by the roller and torch frames with the rod 90 of the roller frame operating back and forth in the torch frame in which it slides, to additionally hold the rollers in line with the sides or bars 68 of the frame 67 to which the torch frame 66 is secured. Thus, as the cam and blank are rotated, the rotation of the blank will result in the proper cutting of the teeth with the torch moving radially of the blank as well as peripherally around the edge thereof, the blank moving the width of the tooth at its end and the distance between the teeth at the roots, while the torch moves radially, in the manner diagrammatically illustrated in Figure 6 of the drawings with the arrow indicating the direction of rotation of the blank. In this manner, any desired number of teeth may be formed on the sprocket or gear, with any size or diameter of sprocket wheel or gear within the various ranges as described, merely by changing the gearing.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. A thermochemical gear cutting apparatus comprising a stationary frame, a spindle journalled in said frame, a shaft within said spindle having its ends extending beyond those of the spindle, a motor rotating said shaft, gear holders supported by said frame, gears detachably mounted in said gear holders and drivingly connecting said motor and said spindle, a blank holder associated with said spindle and rotatable therewith, a cam secured to one extending end of said shaft, a carriage, means mounted on one end of said spindle for supporting said carriage and forming a portion of said blank holder, a cutting device secured to said carriage, and means secured to said carriage and engaging said cam for transmitting rotative movement of said shaft to bodily linear displacement of the carriage.

2. The combination of claim 1 including resilient means attached to said carriage and reacting on said frame for biasing said carriage towards said cam.

3. A thermochemical gear cutting apparatus comprising a frame, a spindle journalled in said frame, a shaft within said spindle and having an end extending therebeyond, a motor rotating said shaft, gear holders supported by said frame, gears detachably mounted in said gear holders and drivingly connecting said motor and said spindle, a blank holder associated with said spindle and rotatable therewith, a cam secured to the extending end of said shaft, a carriage, means fixed to said spindle for supporting said carriage inwardly of said cam and forming a portion of said blank holder, a cutting device secured to said carriage, and means secured to said carriage and engaging said cam for transmitting rotative movement of said shaft to bodily linear displacement of the carriage, said movement transmitting means including a cam follower mounted on said carriage, and means for resiliently biasing said carriage and for urging the follower against the cam, said cutting device being adjustably mounted on said carriage for adjustment axially of the carriage.

4. In a thermochemical gear cutting apparatus, a frame having a spindle journalled therein, a concentric shaft positioned in said spindle, spaced gear holders attached to said frame, means for rotatably actuating said shaft and said spindle, said last mentioned means including a plurality of gears detachably supported in both of said gear holders, whereby gear ratios of selection may be effected by application of selected gears within the holders, a carriage, a torch adjustably supported on said carriage, means for supporting a blank adjacent the torch and for supporting said carriage, and means for transmitting rotative movement of the shaft to lineal movement of the carriage, said blank supporting and torch carriage supporting means including a sleeve detachably secured to said spindle, and grooved rollers carried by said sleeve.

5. In a thermochemical gear cutting apparatus, a frame, a spindle journalled on said frame, a shaft within said spindle, a motor for rotating said shaft, gear holders supported by said frame in spaced relation relative to each other, reduction gearing between said gear holders, gears detachably secured to each of said holders and drivingly connected with said reduction gearing, a cap secured to said spindle and a sleeve secured to said spindle spaced from said cap, said cap and sleeve cooperating to form a blank holder, a cam secured to said shaft, rollers carried by said sleeve and a carriage mounted on said rollers, said carriage having a torch adjustably supported thereon, the nozzle of the torch being in proximity to the blank holder, a cam follower attached to said carriage and engaging said cam.

6. In a thermochemical gear cutting apparatus, a frame, a spindle journalled on said frame, a shaft within said spindle, a motor for rotating said shaft, gear holders supported by said frame in spaced relation relative to each other, reduction gearing between said gear holders, gears detachably secured to each of said holders and drivingly connected with said reduction gearing, a cap secured to said spindle and a sleeve secured to said spindle spaced from said cap, said cap and sleeve cooperating to form a blank holder, a cam secured to said shaft, rollers carried by said sleeve and a carriage mounted on said rollers, said carriage having a torch adjustably supported thereon, the nozzle of the torch being in proximity to the blank holder, a cam follower attached to said carriage and engaging said cam, a support on said frame, a spring attached to said support and said carriage for returning said carriage after it has been actuated by said cam and for biasing said cam follower against said cam.

7. A thermochemical gear cutting apparatus comprising a stationary frame, a spindle journaled in said frame, a shaft journaled in said spindle, means for rotating said shaft and spindle at different speeds, a carriage having a torch mounted thereon, a sleeve detachably secured to said spindle, supporting means on said sleeve slidably supporting said carriage, said sleeve and spindle rotatably supporting a blank adjacent said torch, means actuated by said shaft for linearly moving said carriage.

8. A thermochemical gear cutting apparatus comprising a stationary frame, a spindle journaled in said frame, a shaft journaled in said spindle, means for rotating said shaft and spindle at different speeds, a carriage having a torch mounted thereon, a sleeve detachably secured to said spindle, supporting means on said sleeve slidably supporting said carriage, said sleeve and spindle rotatably supporting a blank adjacent said torch, means actuated by said shaft for linearly moving said carriage, said rotating means comprising driving means operatively connected with said shaft, speed reduction gearing connecting said shaft and spindle, said reduction gearing being mounted within said frame.

9. In a thermochemical cutting apparatus, a stationary frame, a spindle journaled in said frame, a shaft rotatable in said spindle, spaced gear holders mounted on said frame, means for rotating said shaft and spindle including gears detachably mounted in both said holders, a carriage having a cutting device thereon, a sleeve detachably secured to said spindle and simultaneously supporting a blank adjacent said cutting device and supporting said carriage, said sleeve having rollers thereon for slidably receiving said carriage.

DANIEL A. SCHROCK.

REFERENCES CITED

The following references are of record in the file of this patent:

UNITED STATES PATENTS

| Number | Name | Date |
|---|---|---|
| 2,142,436 | Clabeaux | Jan. 3, 1939 |
| 2,146,086 | Muller | Feb. 7, 1939 |
| 2,190,360 | Howard | Feb. 13, 1940 |
| 2,345,104 | Dittrich | Mar. 28, 1944 |

FOREIGN PATENTS

| Number | Country | Date |
|---|---|---|
| 438,940 | Great Britain | Nov. 26, 1935 |
| 557,767 | Great Britain | Sept. 17, 1943 |
| 417,236 | Germany | Aug. 8, 1925 |